(12) United States Patent
Manders et al.

(10) Patent No.: US 7,063,372 B2
(45) Date of Patent: Jun. 20, 2006

(54) OPEN ROOF CONSTRUCTION FOR A VEHICLE, AS WELL AS A VEHICLE HAVING SUCH OPEN ROOF CONSTRUCTION

(75) Inventors: Peter Christiaan Leonardus Johannes Manders, Horst (NL); Martinus Wilhelminus Maria Nabuurs, Overloon (NL); Paulus Johannes Wilhelminus Munsters, Uden (NL); Joseph Petrus Johannes Sanders, Cuyck (NL); Petrus Martinus Josephus Clephas, Sevenum (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 10/416,126

(22) PCT Filed: Nov. 9, 2001

(86) PCT No.: PCT/NL01/00814

§ 371 (c)(1),
(2), (4) Date: Oct. 17, 2003

(87) PCT Pub. No.: WO02/38407

PCT Pub. Date: May 16, 2002

(65) Prior Publication Data

US 2004/0051347 A1    Mar. 18, 2004

(30) Foreign Application Priority Data

Nov. 9, 2000   (NL) .................................... 1016578

(51) Int. Cl.
*B60J 1/18*    (2006.01)
*B60J 7/06*    (2006.01)

(52) U.S. Cl. .................................. 296/146.16; 296/219
(58) Field of Classification Search ........... 296/216.02, 296/219, 146.14, 146.16, 107.07
See application file for complete search history.

(56) References Cited

U.S. PATENT DOCUMENTS

| 3,333,362 A | * | 8/1967 | Kostin et al. ................. 49/248 |
| 5,016,939 A | | 5/1991 | Nishikawa et al. ......... 296/219 |
| 5,035,463 A | * | 7/1991 | Kato et al. ................... 296/223 |
| 5,054,847 A | | 10/1991 | Asch et al. ................. 296/219 |
| 5,058,944 A | * | 10/1991 | Kim ...................... 296/146.16 |
| 6,457,771 B1 | | 10/2002 | Farber ................... 296/220.01 |

FOREIGN PATENT DOCUMENTS

| DE | 3808910 | * | 10/1989 | ............ 296/146.14 |
| DE | 4113872 | * | 10/1992 | ................. 296/219 |
| DE | 196 04 855 | | 8/1997 | |
| GB | 444 907 | | 3/1936 | |
| IT | 662106 | * | 4/1964 | ............ 296/107.07 |
| WO | WO 01/14158 | * | 3/2001 | ................. 296/219 |
| WO | WO 02/38406 | | 5/2002 | |

* cited by examiner

*Primary Examiner*—Dennis H. Pedder

(74) *Attorney, Agent, or Firm*—Westman, Champlin & Kelly, P.A.; Linda P. Ji

(57) ABSTRACT

The invention relates to an open roof construction for a vehicle, as well as to a vehicle fitted with such an open roof construction, in particular a folding roof. More in particular, the invention relates to special features which make it possible to swing down the folding roof (1) into the boot (5) of the vehicle together with a rear window structure (2) so as to provide a convertible-like vehicle.

19 Claims, 16 Drawing Sheets

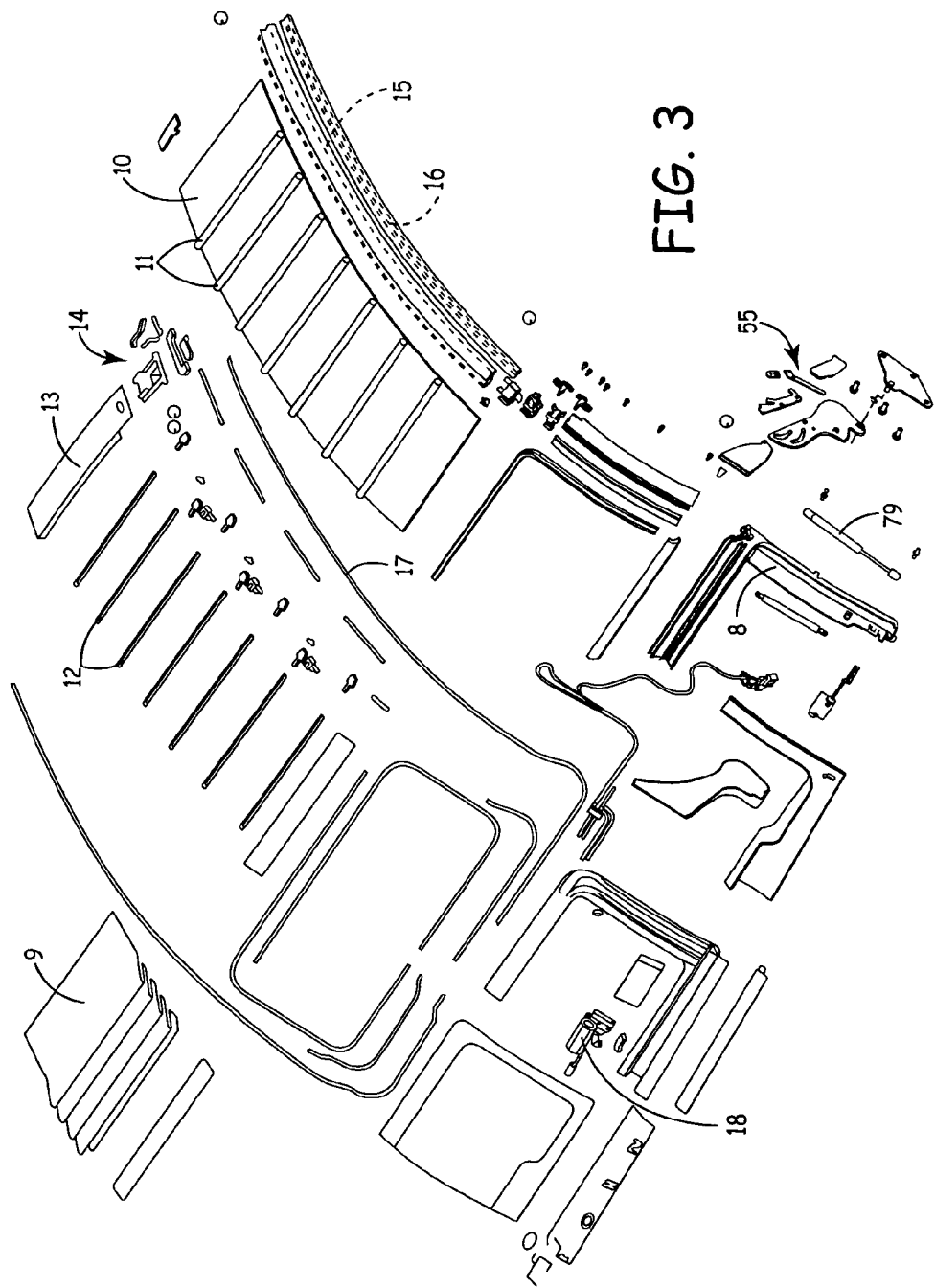

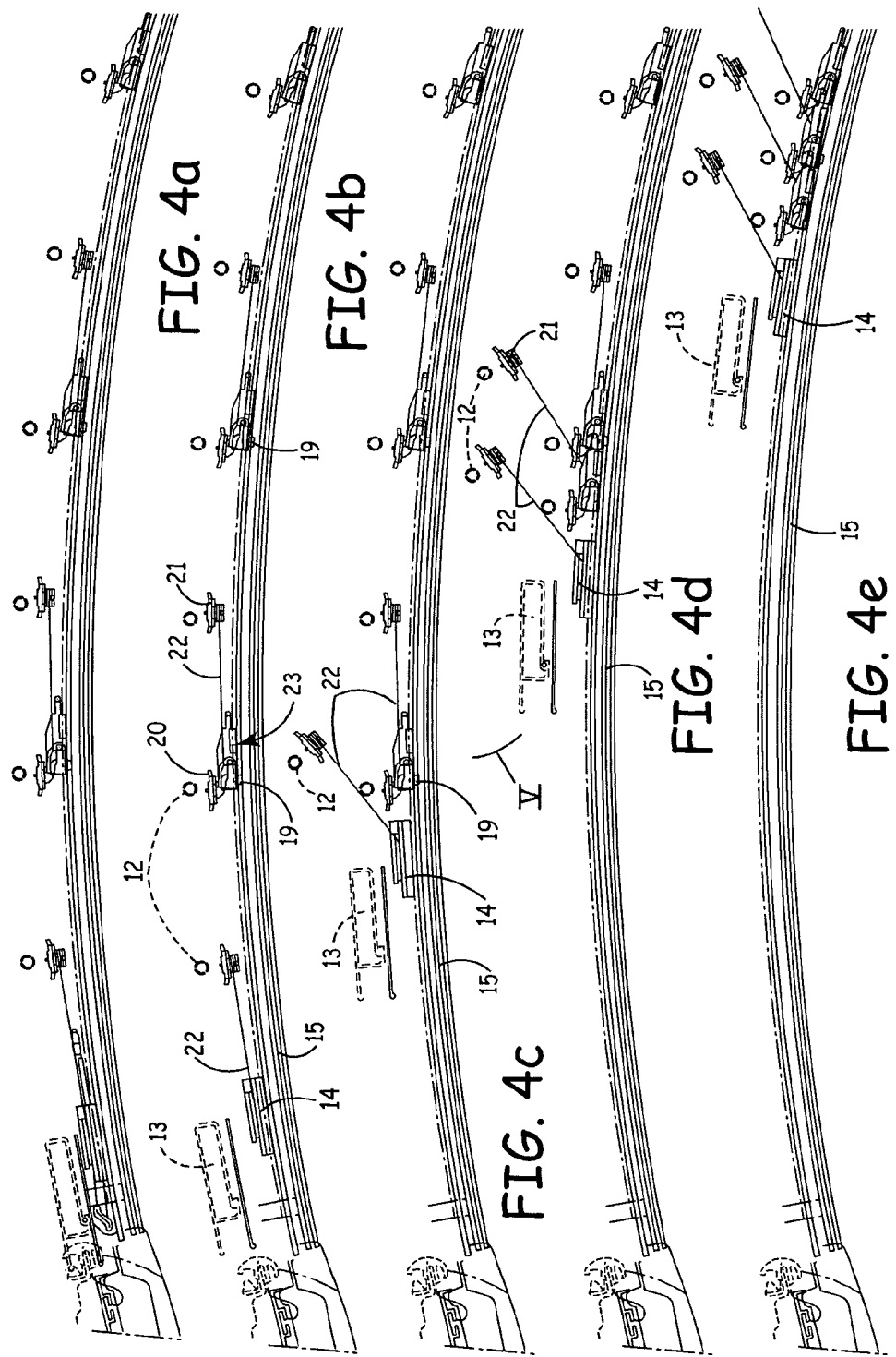

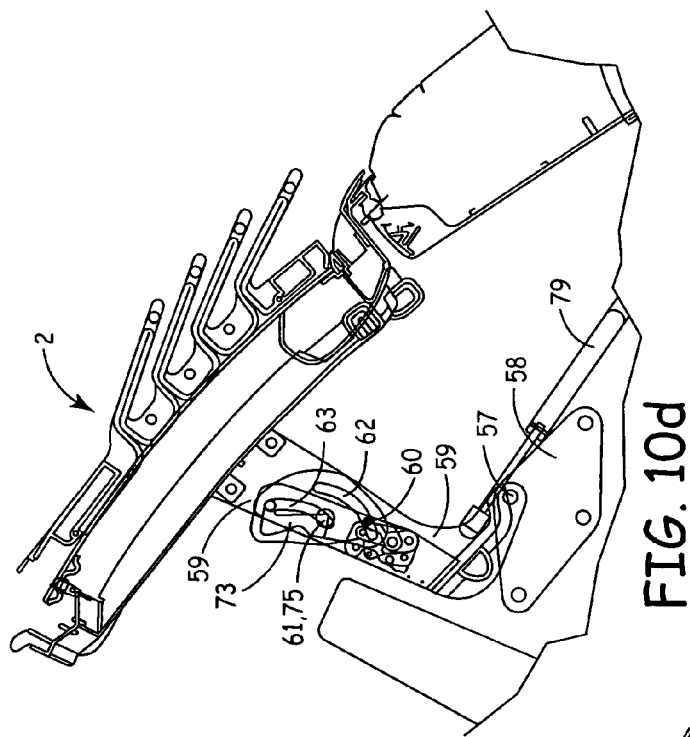
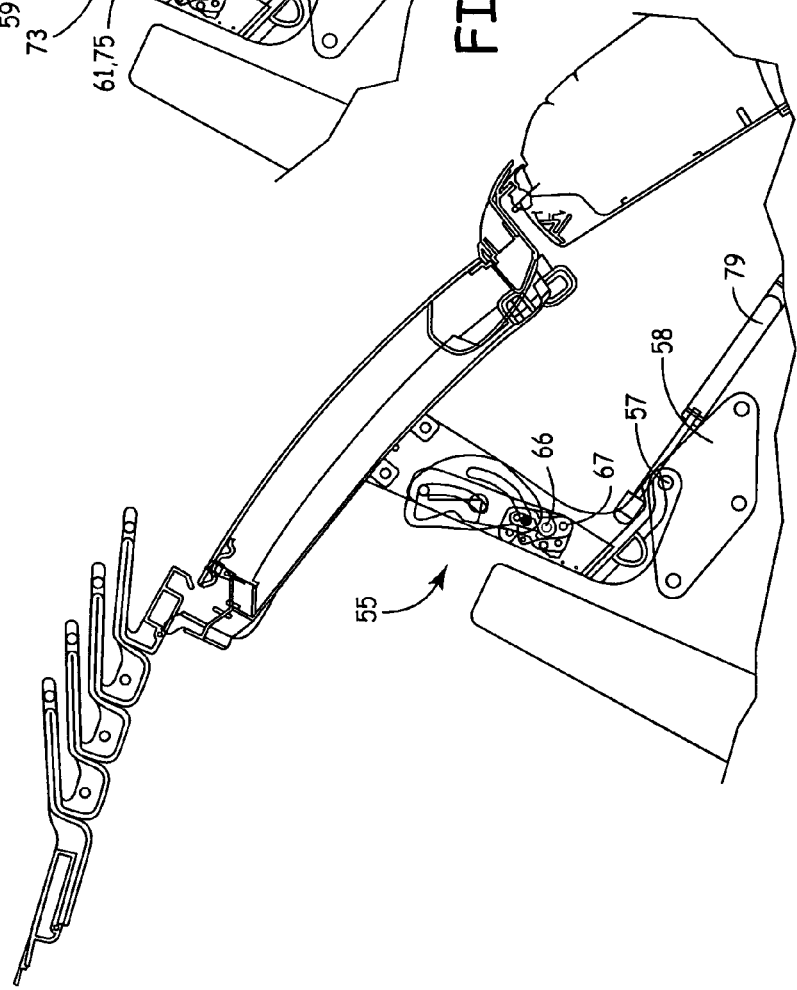

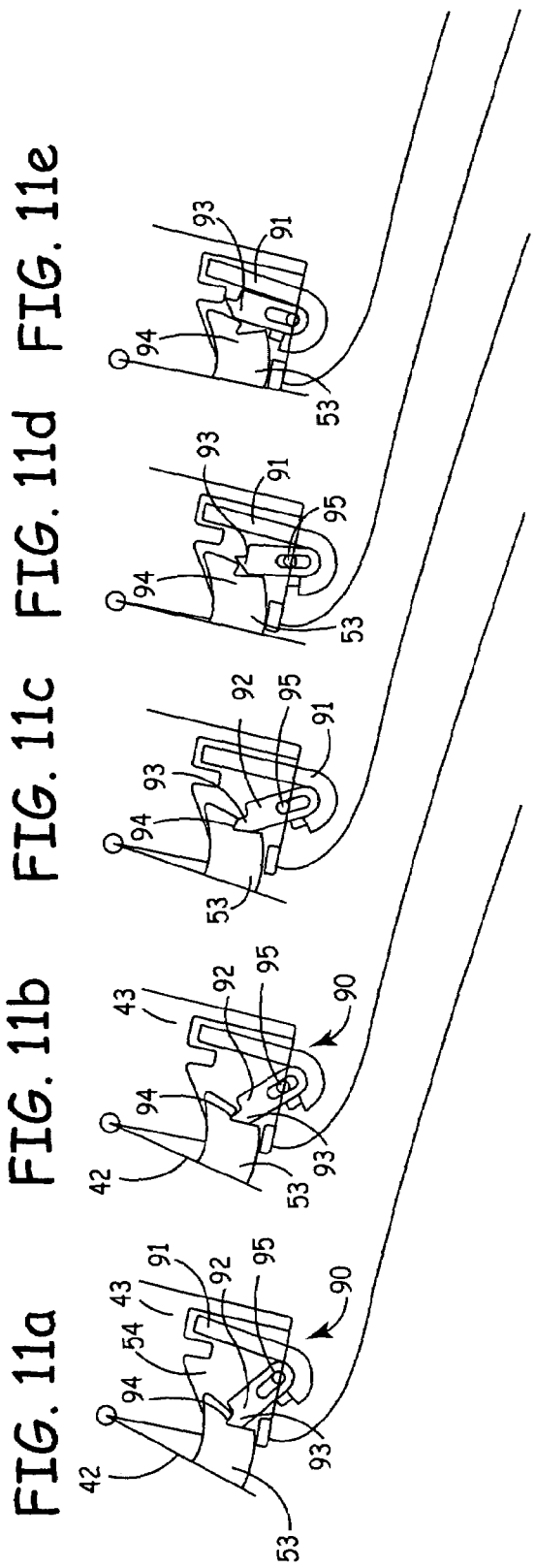

OPEN ROOF CONSTRUCTION FOR A VEHICLE, AS WELL AS A VEHICLE HAVING SUCH OPEN ROOF CONSTRUCTION

The present invention relates to an open roof construction for a vehicle as well as to a vehicle fitted with such an open roof construction, in particular a folding roof. The invention particularly relates to special features which make it possible to swing down the folding roof into the boot of the vehicle together with a rear window structure so as to provide a convertible-like vehicle.

The invention will now be explained in more detail with reference to the drawings, which schematically show an embodiment of the open roof construction of a vehicle according to the invention.

FIG. 3 is a perspective, exploded view of one longitudinal half of the roof construction according to FIG. 1.

FIG. 4 are larger-scale. longitudinal sectional views of one of the guide rails of the folding roof according to FIG. 1 and mating parts in various positions thereof.

FIGS. 11a to 11e illustrate a locking element.

BRIEF DESCRIPTION OF THE ILLUSTRATIVE EMBODIMENTS

Figure 1:
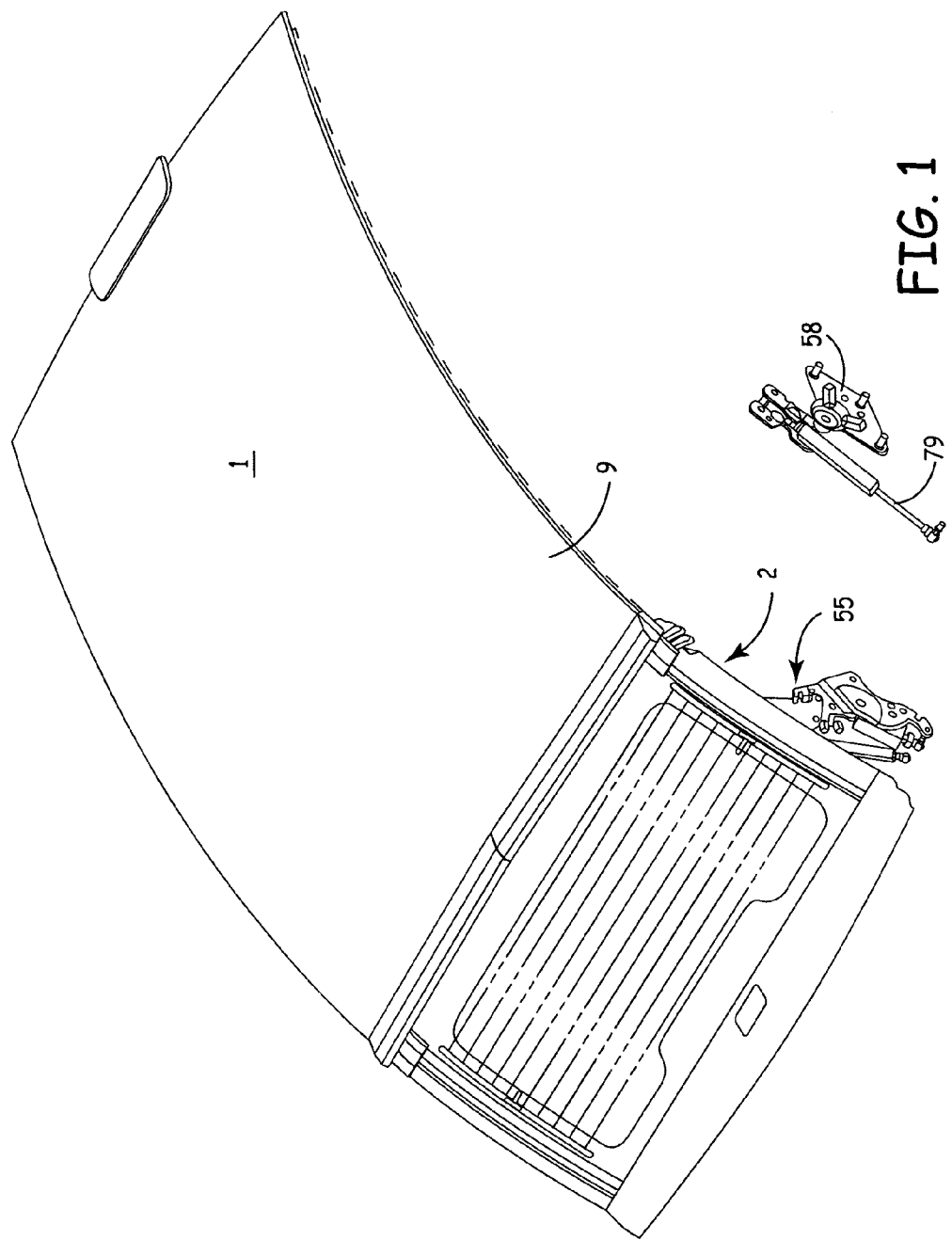
FIG. 1 is a general perspective view of the main components of the roof construction of a vehicle according to the invention.

FIG. 1 is a general view of the main components of the part of the vehicle to which the present invention relates. These main components function to provide various possibilities for "driving with an open top". The first main component according to the invention is a folding roof 1, which can be opened and closed in a usual manner. The second main component is the special rear window structure 2. Said rear window structure 2 is arranged for receiving the folding roof on the upper side in the open position of said folding roof, after which the rear window and the folding roof can be swung back as a whole into the vehicle boot, thus forming a convertible. In addition to that, the side arches (not shown) of the vehicle, which support the folding roof and the rear window, can be removed, so that a spider-like vehicle is obtained. Information about such a vehicle can be found in WO 01/14157, whose contents are incorporated herein by reference.

FIGS. 2a–2g show the operation of the rear window structure.

Figure 2A:
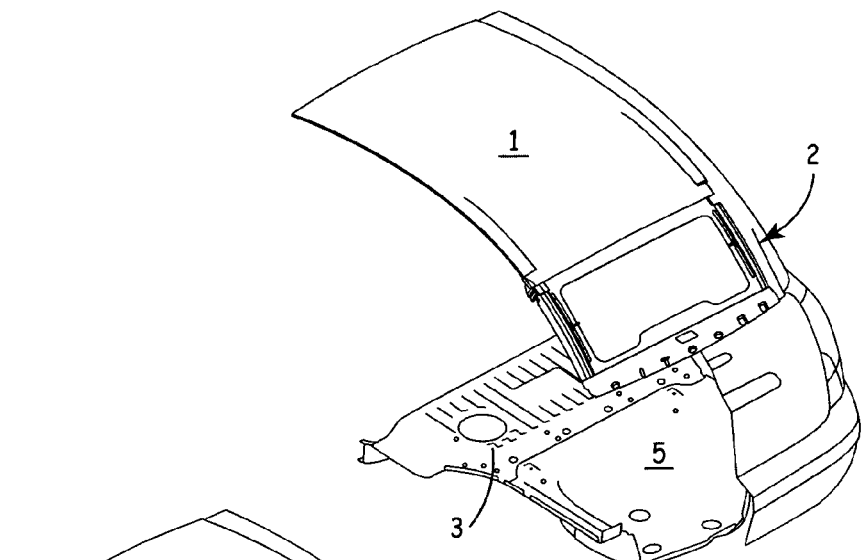
FIGS. 2a–2g are perspective views of the rear part of the vehicle according to the invention, showing the rear window structure and mating parts in seven different positions thereof.

FIG. 2a is a cut-away view of a portion of the rear side of the vehicle, showing the body 3, the rear seat 4 (FIG. 10f), the boot 5 and the boot lid 6.

In FIG. 2a, the folding roof 1, the rear window structure 2 and the boot lid 6 are in the closed position.

Figure 2B:
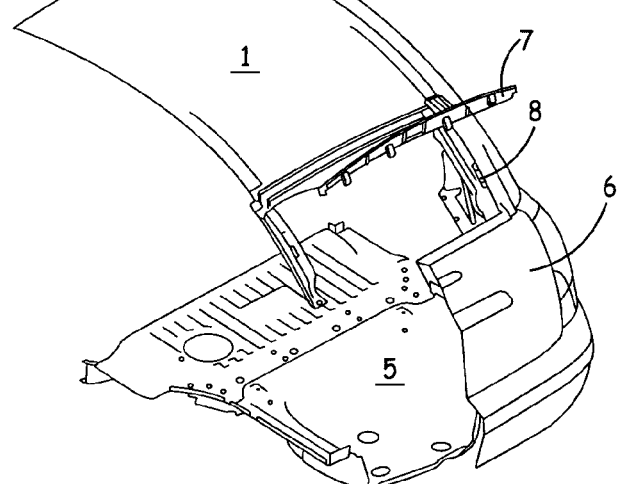

In FIG. 2b, the rear window 7 of the rear window structure 2 has been pivoted to an open position. A frame or cassette 8 of the rear window structure 2 remains locked in the closed position. In this way, the trunk can be made accessible.

Figure 2C:
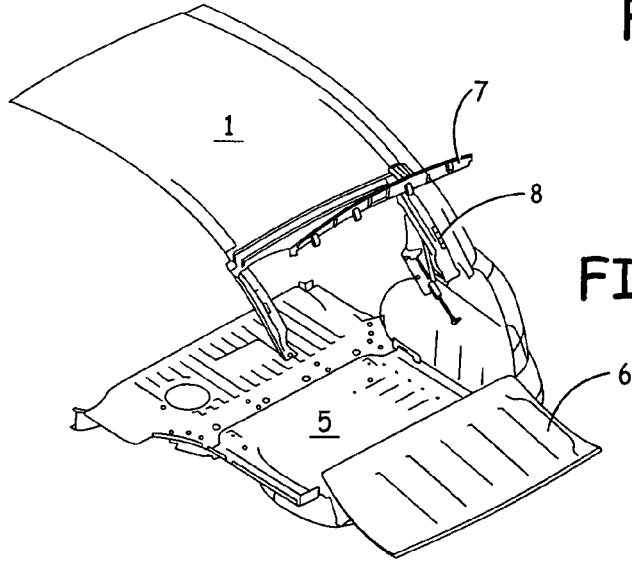

In FIG. 2c, the boot lid 6 has been opened to a horizontal position, in which the lid can be used as a floor part or supporting part.

Figure 2D:
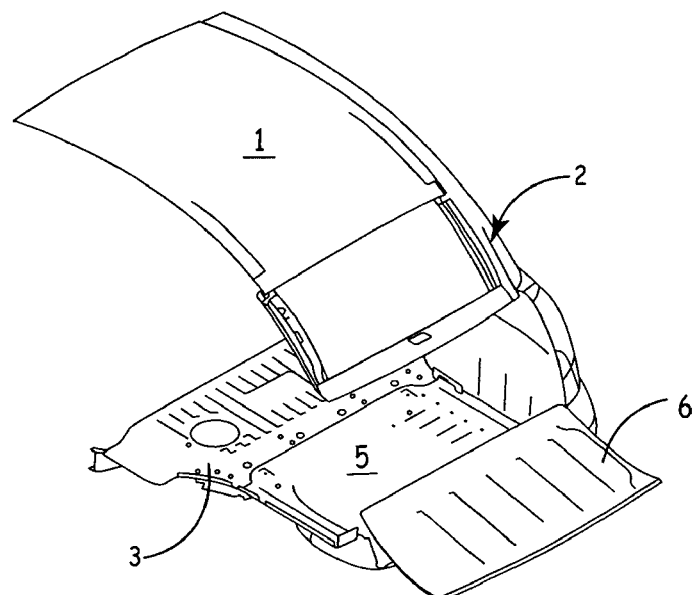

In FIG. 2d, the rear window 7 has been pivoted back to the closed position again, whereas the boot lid 6 is still open.

Figure 2E:
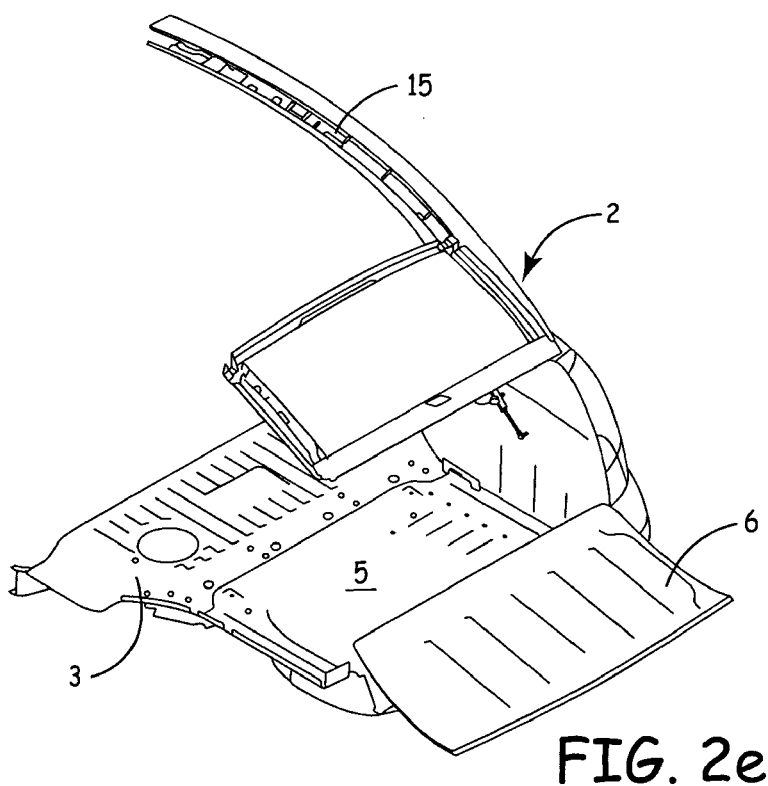

FIG. 2e shows a position in which the entire rear window structure 2, i.e. the frame 8 and the rear window 7 (as well as the open folding roof, which is not shown), after being unlocked, has been pivoted to an intermediate position, in which hinges to be described yet can become detached from a roof part co-operating therewith.

Figure 2F:
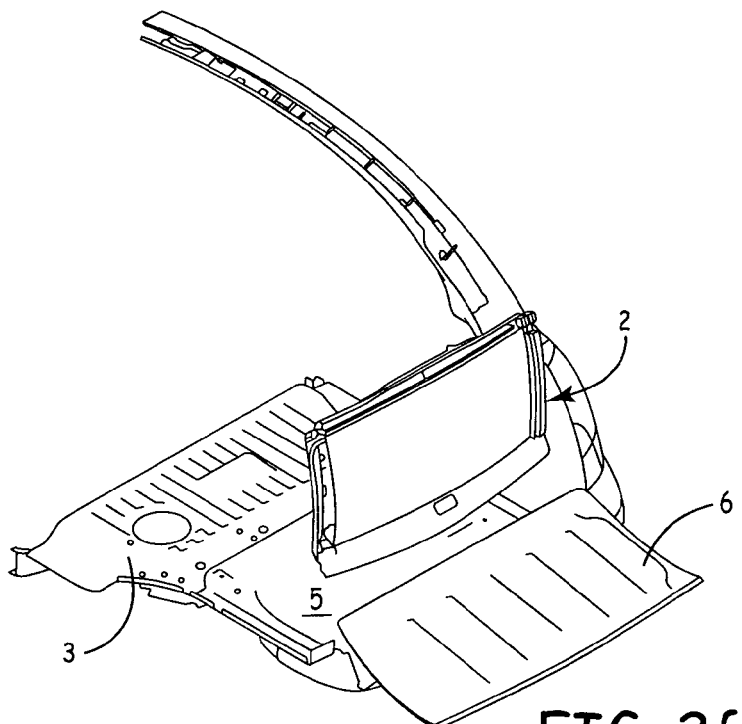

FIG. 2f shows the rear window structure 2 being pivoted downwards in its entirety by means of a special arm construction.

Figure 2G:
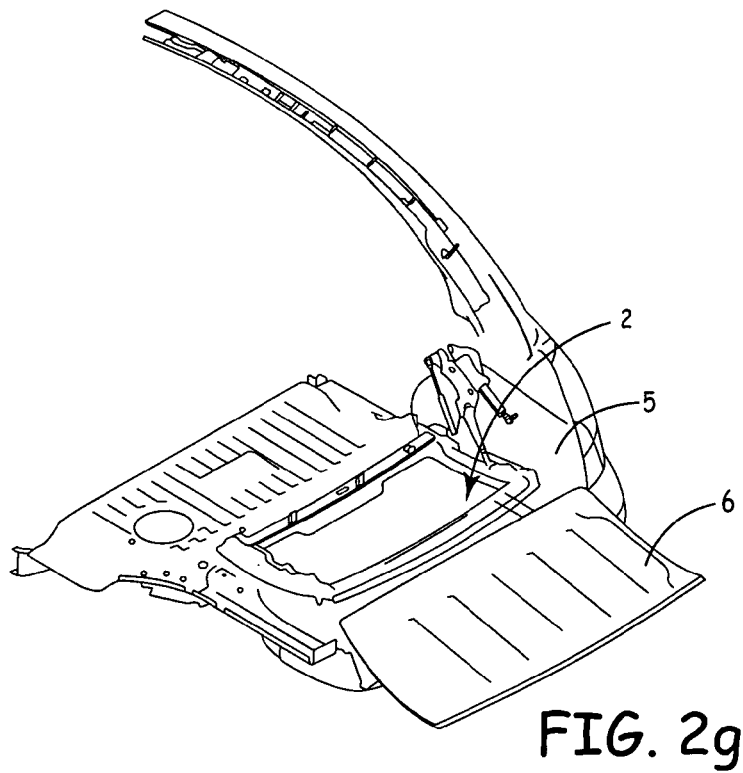

In FIG. 2g, the rear window structure 2 has been moved to a hollow space on the bottom of the boot 5, in which the rear window structure 2 is accommodated in a horizontal, upside-down position. The rear window structure 2 can be covered by a floor part (not shown), thus forming a boot which is ready for normal use again. In this position, it is also possible to close the boot lid 6.

Hereinafter, a description will be given of various parts of the special roof construction of the vehicle that assist in the aforesaid operation.

FIG. 3 is an exploded view of the part of the main components of the roof construction according to the invention that are shown in FIG. 1.

The following parts of the folding roof 1 can be distinguished: a foldable liner 9, a lower cover 10 fixed to the underside thereof, which includes loops or sleeves 11 for receiving stiffeners 12. An operating beam 13, which controls the opening and closing of the folding roof, is arranged on the opening side of the liner 9, the front side in this case. To this end, the operating beam 13 is slidably guided in guide rails 15 by means of a special slide construction 14. The guide rails 15 are disposed on either side of a roof opening in the vehicle, in the longitudinal direction thereof. In this specific embodiment, the guide rails 15 are mounted on arch structures (not shown) at the sides of the vehicle and sealed by means of a seal 16. The slide constructions 14 at the ends of the operating beam 13 can be driven by means of driving cables 17, which are guided through the guide rails 15 towards the rear window structure 2, where a driving motor 18 is present.

The stiffeners 12 of the liner 9 are supported on slides that will be explained in more detail yet below.

Figure 5:
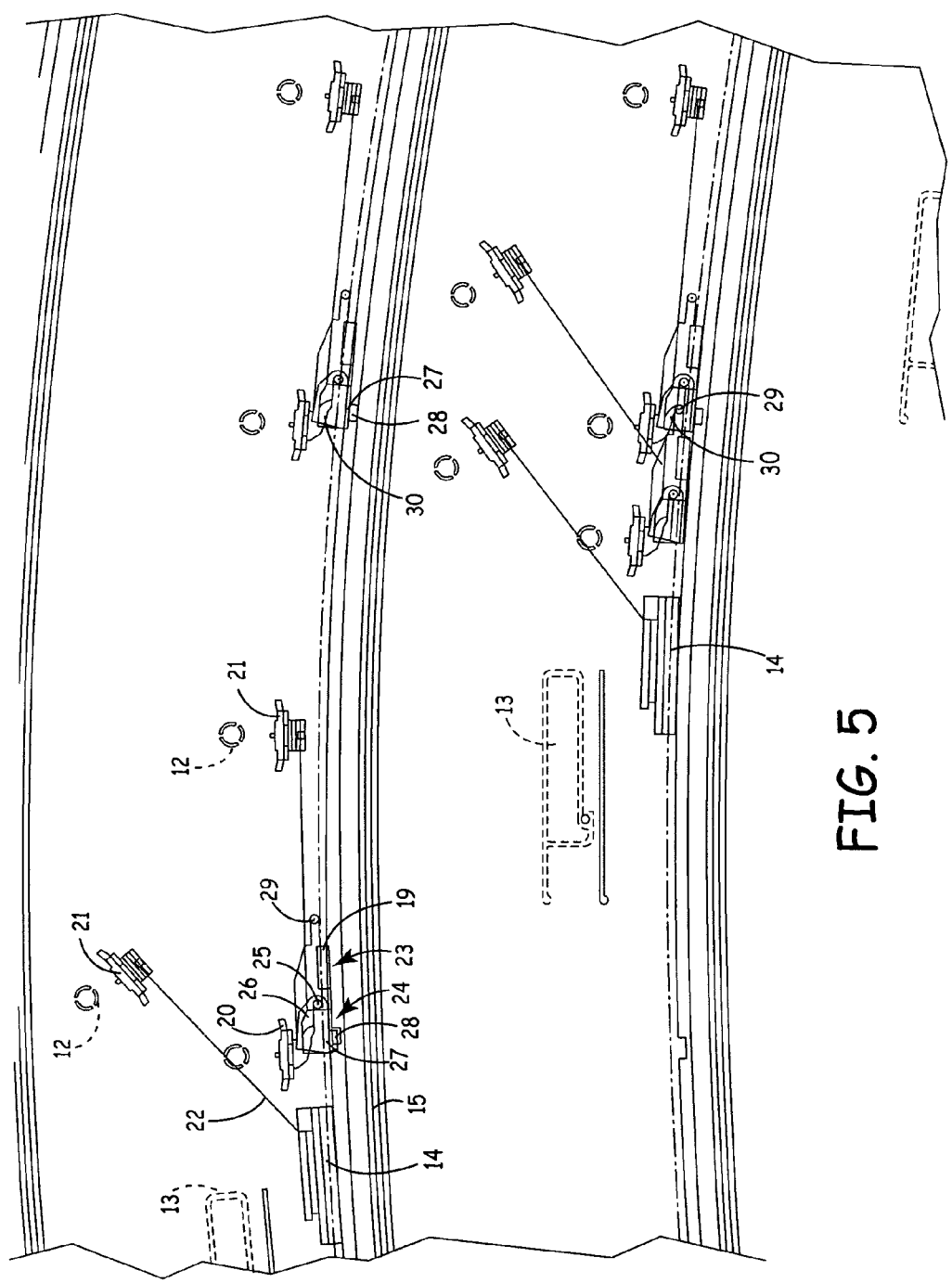
FIG. 5 is a larger-scale detail V of FIG. 4.

FIGS. 4 and 5 are longitudinal sectional views of one of the guide rails 5 and the parts that are slidable therein. In addition to the guide rail 15, the operating beam 13 with the associated slide construction 14 as well as the stiffeners 12 can be distinguished. Some of the stiffeners are arranged on a support 20 which is fixed to an associated slide, whereas other stiffeners 12 are arranged on supports 21 which are pivotally connected to an identical slide 19 via a leaf spring. The leaf springs 22 load the supports 21 in upward direction. Upon rearward movement of the front slide construction 14, which likewise includes a leaf spring 22 and a support 21 with stiffener 12, and rearward movement of a slide 19, the liner 9 will be slackened, and the upwardly moving stiffener 12 will cause the liner to extend upwards in a fold. This is shown in FIGS. 4a–4e.

In order to ensure that a slide 19 will not start to move until a preceding slide 19 or the preceding slide construction 14 has moved so far rearwards that the fold is complete, each slide 19 is fitted with a locking element 23, which mates with an associated counter element 24 in guide rail 15, whereas the slide construction 14 of the operating beam 13 that is disposed in front of the sliding shoe 19 in question or the preceding slide 19 is provided with an unlocking element for unlocking the successive sliding shoes. In this embodiment, the locking elements 23 consist of a horizontally movable locking element 25, which is in particular pivotable about a horizontal pivot 25, which comprises a downwardly extending cam 27, which can engage in a recess 28 in the bottom of the guide rail 15. This engagement of the cam 27 in the associated recess 28 takes place when the slide 19 in question has reached its frontmost position.

In order to be able to actuate the locking element 23, the slide 14/19, which is positioned in front of said locking element, seen in the opening direction, is fitted with an unlocking element 29 in the form of a pin extending in the direction of the next sliding shoe 19, seen in the opening direction, which can come into engagement with a slot 30 formed in the moving locking member 26 of the locking element 23. Said slot 30 extends in a direction which deviates from the direction of movement of the slide 19. This direction is such that the pin of the preceding slide 14/19 can enter the slot 30 in the position in which the cam 27 engages in the recess 28, whereas the locking member 26 is pivoted upwards about pivot 25 by the pin 29 upon passage through the slot 30, as a result of which the cam 27 will move out of the recess 28 and the slide 19 in question can start to follow the preceding slide 14/19.

Since the cam 27 runs on the bottom of the guide rail 15 in that situation, and the locking member 26 is thus locked in an upwardly pivoted position, the pin of the unlocking element 29 is locked in position in the slot 30, so that the adjacent sliding shoes 14/19 are locked into one unit. In this way, a very controlled folding movement of the folding roof takes place.

As already mentioned before with reference to FIGS. 1 and 2, the folding roof can be moved to a position on the rear window structure 2 in the entirely open position, so that the folding roof 1 can be swung back into the boot 5 together with the rear window structure 2. First of all, the folding roof will have to be detached from the guide rails 5 in order to make this possible. In the normal open and closed positions of the folding roof, a rear cover plate 31 is present at the rear end thereof, which cover plate is stationary and which provides a seal with respect to the fixed roof. Said rear cover plate 31 is supported at the ends by slides 32 which are movable in the guide rails 15, each slide comprising an unlocking and vertical adjusting mechanism 33 to be operated by an adjacent sliding shoe 19 of the folding roof for moving the cover plate 31 upwards before the folding roof, which is locked into a unit in the entirely open position, can be moved further to a position on the rear window structure 2. The height adjusting mechanism comprises a link plate 31 at each end of the cover plate 31, in which two identical slots 35 are present, in which pins 36 of the slide 32 engage.

Figure 6:
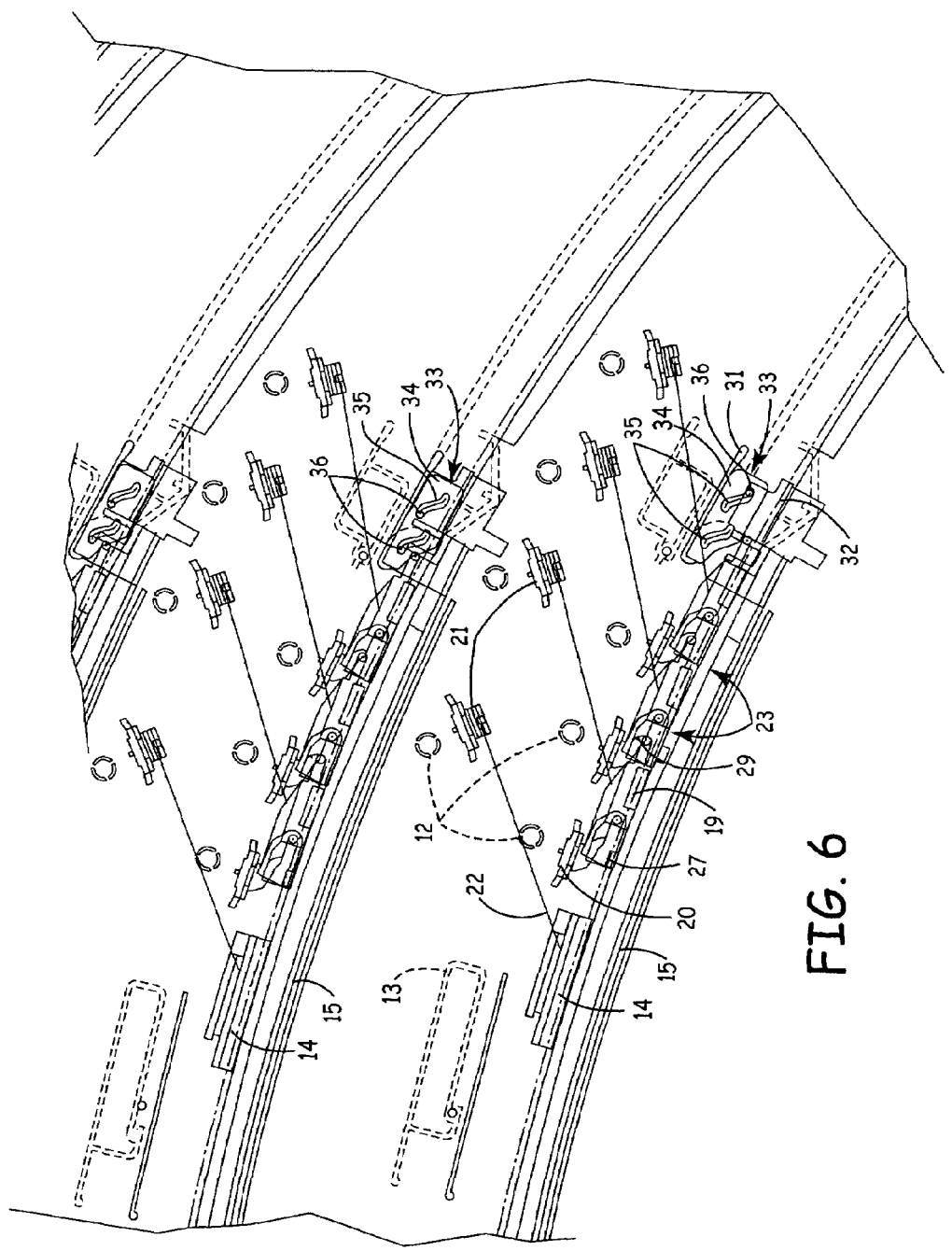
FIG. 6 are larger-scale, longitudinal sectional views of the rear part of one of the guide rails and the front part of the rear window structure in various positions thereof before the folding roof moves onto the rear window structure.

As has been described in the foregoing, the driving cables 17 of the folding roof 1 extend from the guide rails 15 into the rear window structure 2, in which the driving motor 18 is present. The purpose of this arrangement is to pull the folding roof unit onto the rear window structure 2 as a unit in the entirely open position that is shown in FIG. 6. To this end, the rear window structure includes guide rails 40 on either side, which are aligned with the guide rails 15 in the closed position of the rear window structure 2.

It has been described with reference to FIGS. 2b and 2c that the rear window 7 of the rear window structure 2 can be pivoted upwards, in which case the driving cables 17 extending through the guide rails 15 and 40 need to pass through a bend. The special pull/push cables 17 cannot pass through a bend having a radius of curvature other than a specifically defined one, however. In order to ensure that the cables will pass through a bend having a fairly small radius of curvature upon pivoting of the rear window 7, a special hinge assembly 41 is fitted between the guide rails 15 and 40.

Figure 7:
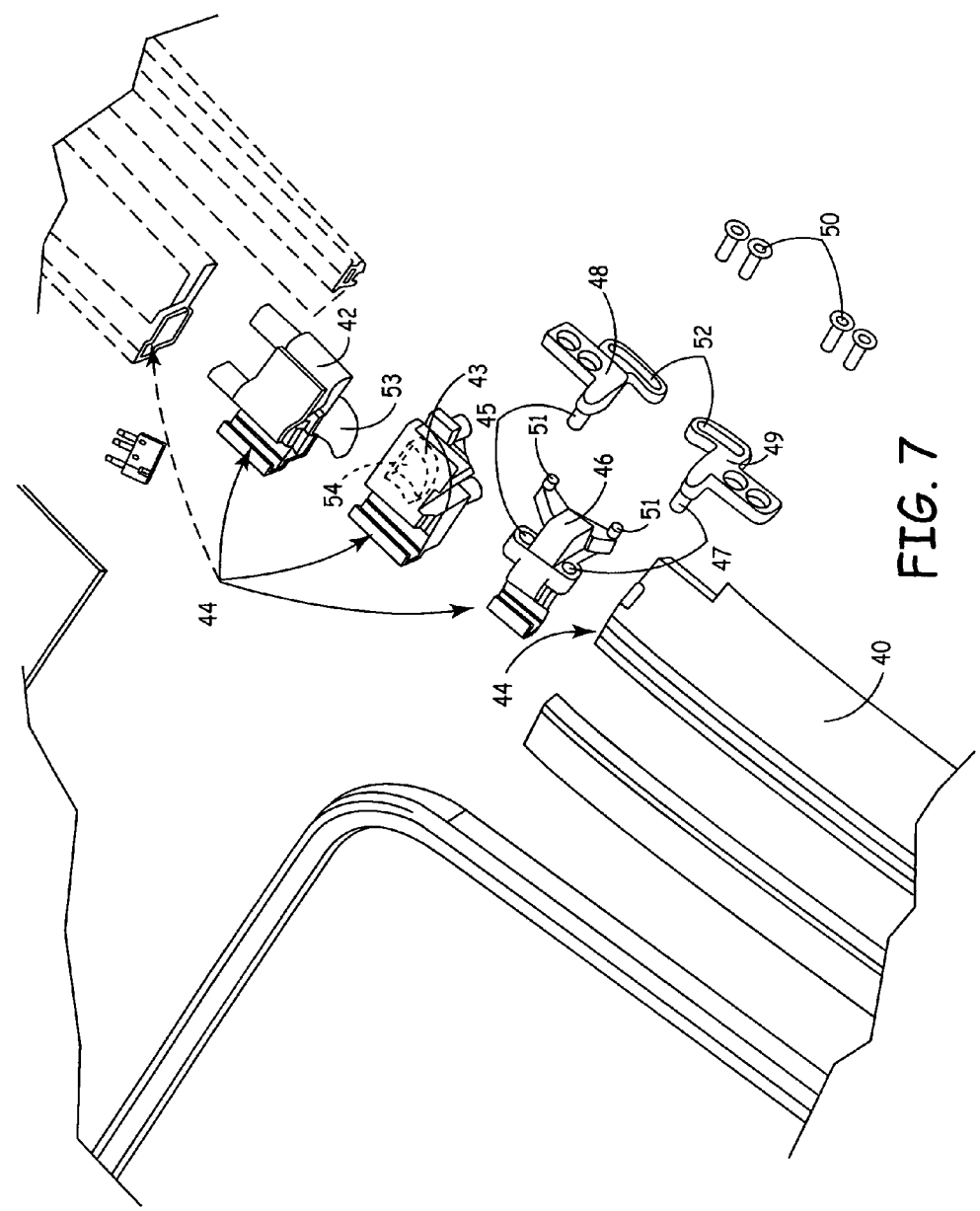
FIG. 7 is a perspective, exploded view of the rear part of the guide rail and the transition to the rear window structure.
Figure 8:
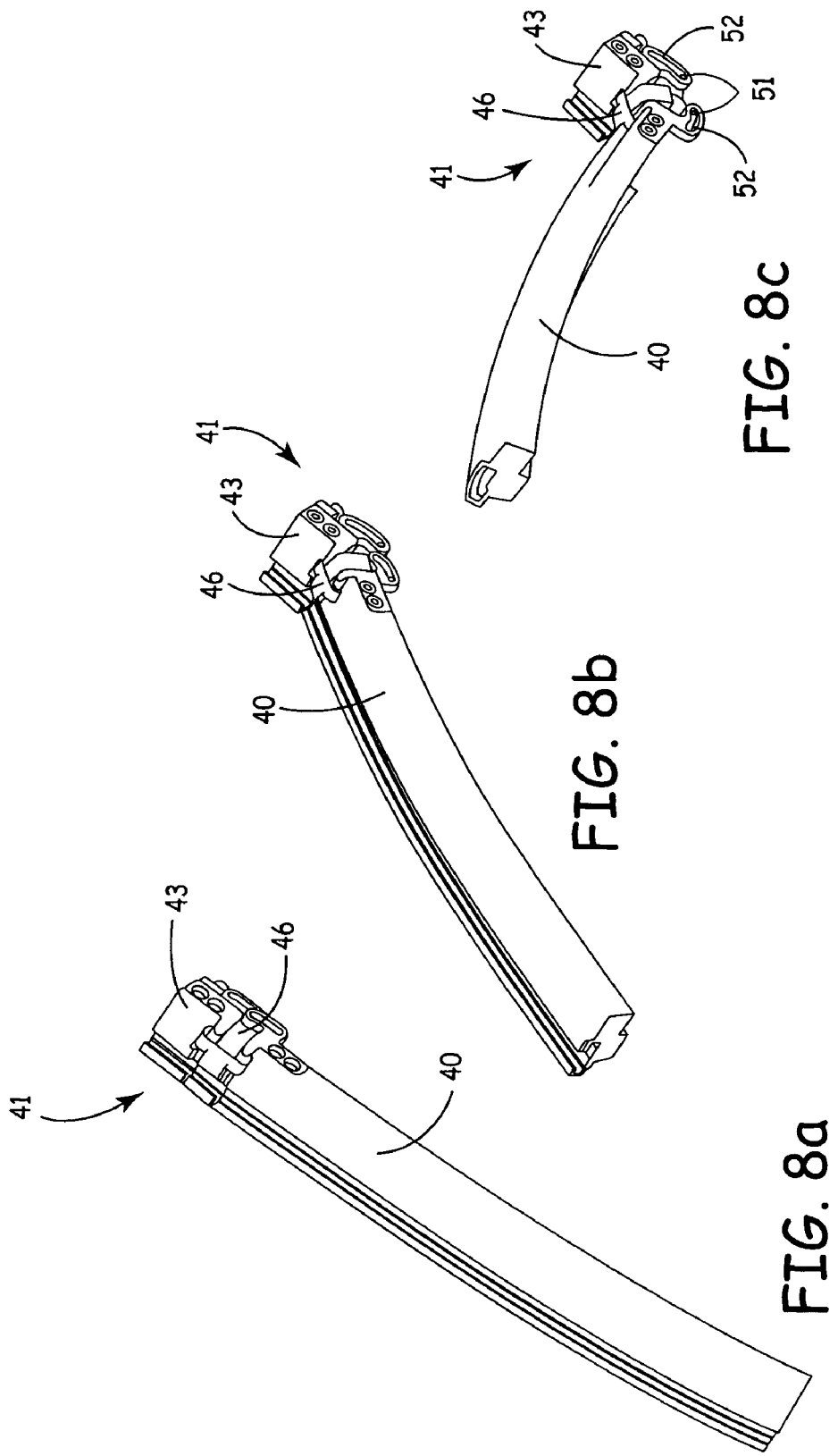
FIGS. 8a–8c are perspective views of the transition from the guide rail to the rear window structure, showing various positions thereof to illustrate the operation of a hinge construction arranged therebetween.

FIGS. 7 and 8 show the construction and the operation of the hinge assembly 41. In FIG. 7, the guide rails 15 and 40 as well as part of the rear window 7 of the rear window structure 2 can be distinguished. The end of the guide rails 15 that faces towards the rear window structure 2 terminates in a fitting element, which will be discussed in more detail yet. A counter element 43 is fixed to the fitting element 42 in the closed position of the rear window structure 2, and consequently said counter element forms part of the guide rail 15, because a groove 44 that is present therein guides the various mutually aligned and adjoining slides 14, 19, 32.

The hinge assembly 41 comprises a first hinge 45, which connects the counter element 43 to an intermediate element 46, as well as a second hinge 47 which is spaced therefrom by some distance, which second hinge enables a pivoting movement between the intermediate element 46 and the guide rail 40. The hinges 45 and 47 consist of pin-hole hinges, the holes being formed in the intermediate element 46, whereas the pin is formed on a separate part 48 and 49, respectively, which is fixed to, respectively, the counter element 43 and the guide rail 40, e.g. by means of screws 50. The intermediate element 46 and the parts 48 and 49 also include guide means and stop means in the form of two stop pins 51 on intermediate element 46, which are inserted in stop slots 52 in the part 48, 49. Also other or additional stop means are conceivable, of course.

The effect that is achieved by using this hinge assembly 41 is that the virtual pivot point between the guide rails 15 and 40 will be located at a point inwardly spaced therefrom, or that the deflection of the guide rail is divided into two, as a result of which the angular distortion of the deflection is halved. The pivoting movement is such that the length of the part through which the cable 17 extends does not change. Preferably, the amount of space that is available for the cable 17 is such that the cable can pass through one large bend. FIGS. 8a–8c show the closed position of the rear window (FIG. 8a), the half open position, in which the rear window has pivoted through 40° with respect to the guide rail 15 (FIG. 8b), and the entirely open position, in which the rear window 7 has pivoted through 80° with respect to the guide rail 15 (FIG. 8c).

As has been described before, the various slides 14, 19 and 32 of the folding roof 1 must pass several transitions between parts upon transferring the folding roof unit between the guide rails 15 of the fixed roof and the guide rails 40 of the rear window structure 2, viz. from the guide rails 15 to the fitting element 42, the counter element 43, the intermediate element 46 and the guide rail 40. In order to provide an unimpeded passage, without upright edges being formed at the transitions due to tolerances that may be present, which edges impede or prevent the passage of the slides 14, 19 and 32, the grooves in the various parts of the guide rail diverge slightly in transverse direction and/or in vertical direction at the ends that face towards each other in interconnected condition. In this way, the forming of upright edges at the transition is avoided, also in the case of a slight movement of the parts 15, 42, 43, 46 and 40 relative to each other. Thus, a smooth transition of the folding roof unit between the rear window structure 2 and the roof part is ensured.

As has already been mentioned before, the guide rails 15 and the rear window structure 2 are interconnected via the fitting element 42 and the guide rail 15 and the counter element 43 on the rear window structure. To this end, the fitting element 42 includes a hook-shaped member 53, which can engage in a mating locking recess 54 in the counter element 43. The hook-shaped member 53, and thus also the locking recess 54, are tapered in vertical direction and in transverse direction, as a result of which the hook-shaped member 53 readily fits in the locking recess and can be guided to an exactly defined positioned by the tapered walls of said recess, also when the fitting element 42 and the counter element 43 are not entirely correctly aligned. Alignment errors are corrected in this way, and it is ensured that each guide rail 40 of the rear window structure 2 properly adjoins the associated guide rail 15.

FIGS. 11 *a–e* show an improved version of the locking element 53 and the mating counter element 54. The locking element 53 is still in the form of a hook-shaped member, whereas the locking recess 54 forms the mating counter element. Both the hook-shaped locking element 53 and the locking recess 54 can be tapered both in a vertical direction and in a transverse direction.

This embodiment includes an additional retaining mechanism 90, which retains the locking element 53 in position in the locking recess 54 as long as the locking element 53 does not engage in the locking recess 54 sufficiently far. This makes it possible to prevent a situation in which one of the locking elements 53 slips out of the locking recess 54 again, causing dislocation of the rear window structure 2, partially due to the large weight and the resulting large moment thereof, when the rear window structure 2 is closed askew, for example because the vehicle is not in a level position or because the rear window structure 2 is pulled out of alignment by the person operating the construction.

The retaining mechanism 90 includes a retaining element 92 which is loaded by a tension spring 91, which element is inserted in locking recess 54 and which includes a nose 93 which is capable of engaging in a retaining recess 94 in the locking element 53. The retaining element 92 is slidable and pivotable about a traverse pin 95. In a starting position, the retaining element 92 extends obliquely in the direction of the opening of the locking recess 54, in which position it lies in the path of the locking element 53. The shape, the location and the movement of the parts is such that the following operation is obtained.

When the locking element 53 engages in the locking recess 54, the front side of the locking element 53 will come into contact with the nose 93 of the retaining element 92, so that the retaining element will be pushed back slightly along the traverse pin 95 against the pressure of spring 91. If the locking element 53 engages sufficiently far in the locking recess 54, the nose 93 of the retaining element 92 will snap into the retaining recess 94. In this position, which is shown in FIG. 11*a*, it is no longer possible to move the locking element 53 out of the locking recess. The shape of the part of the locking element 53 that is positioned before the retaining recess causes said part to hook behind the nose 93. The retaining element 92 cannot pivot outwards, and the force on the retaining element 92 with respect to the traverse pin 95 is such that the retaining element will not be pushed back along the traverse pin 95. In this position, the locking element 53 is secured against "falling out or being pulled out", therefore.

If the locking element 53 is moved further into the locking recess 54, however, as is shown in FIG. 11*b*, the retaining element 92 will be pushed back by the locking element 53 and will be pivoted back about the traverse pin 95. As can be seen in FIGS. 11*c* and 11*d*, the nose 93 of the retaining element 92 will eventually move out of the retaining recess 54, which is made possible by the respective configurations of said element and said recess.

In the entirely locked position according to FIG. 11*e*, the retaining element 92 abuts against the front side of the locking element 53, whereas the spring 91 keeps the retaining element 92 in its upwardly pulled position.

If the locking element 53 is moved out of the locking recess 54 from this position, the retaining element 92 will follow the pivoting movement of the locking element 53 in that the retaining element 92 will pivot rather than slide under the influence of the action of the spring 91. This prevents the nose 93 of the retaining element 92 from snapping into the retaining recess 94 in the locking element 53 again, so that the locking element 53 can be removed from the locking recess 54 without any problems.

Figure 9:
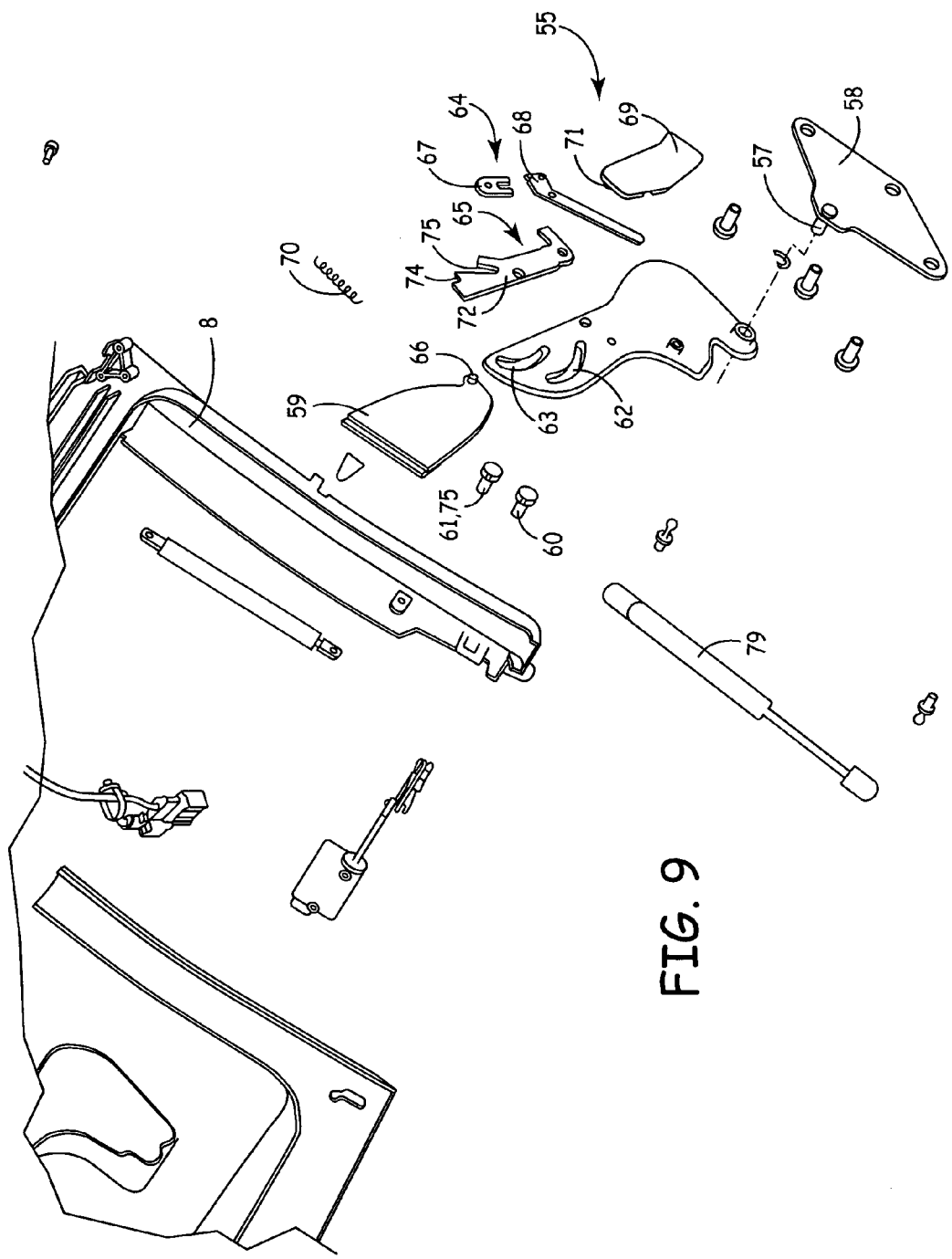
FIG. 9 is a larger-scale perspective, exploded view of one of the arms of the rear window structure according to FIG. 2.

FIG. 9 shows yet another main component of the special roof construction according to the invention, viz. one of the arms that are to pivot the rear window structure 2 from the closed position, in which it functions as the rear window, to the stored position in the boot 5 of the vehicle. In FIG. 9, the frame 8 of the rear window structure 2 can be distinguished; the arm consists of a first arm member 56, which is connected to a body part 58 by means of a pivot 57, as well as a second arm member 59, which is fixed to the frame 8 of the rear window structure 2. The arm members 56 and 59 are in engagement with each other by means of two pin-slot joints comprising pins 60 and 61 on the second arm member 59, which engage in associated slots 62 and 63 in the first arm member 56. The configuration of the slots 62 and 63 and the relative positions of the pins 60 and 61 determine the movement of two arm members relative to each other. Each arm 55 includes two locking means 64 and 65, the first locking means 64 function to lock the arm members 56, 59 in such a position relative to each other that the rear window structure 2 is locked in the position in which it functions as the rear window (FIG. 2*a*), whereas the second locking means 65 lock the arm members 56 and 59 from the intermediate position according to FIG. 2*e* to the stored position according to FIG. 2*g*.

The first locking means 64 comprise a locking pin 66 formed on lower end of the second arm member 59, as well as a latch 67 comprising a locking arm 68. The latch 67 and the locking arm 68 are arranged on a latch housing 69, which is connected to the arm member 56. A spring 70 keeps the locking arm 68 biased.

The second locking means 65 comprise a locking plate 72 which is spring-loaded in the direction of the locked position and which is pivotally connected to a first arm member 56 about a pin 71, in which locking plate a locking slot 73 including a locking portion 74 is present. The second locking means 65 furthermore comprise a second locking pin 75 on the second arm member 59, which is positioned in the locking portion 74 in the aforesaid intermediate position. The locking pin 75 forms part of the pin 61 in the illustrated embodiment.

A gas spring 79 or the like connected to the body 3 engages the first arm member 56, thus ensuring that a counter force is exerted on the arms 55 and the rear window structure 2, which facilitates the adjustment thereof.

The operation of the above-described arm 55 for the rear window structure is as follows. In the closed position of at least the frame 8 of the rear window structure 2, the second arm member 59 occupies its lower position with respect to the first arm member 56 (FIGS. 10a–d). In this position, the first locking pin 66 is retained in the latch 67 (see FIG. 10c), which is blocked by the locking arm 68 (not shown). The pins 60 and 61 of the first arm member 56 are present at the lower end of the associated slot 62 and 63, respectively. The second locking pin 75 is present at the lower end of the second locking slot 73. In this lower, locked position of the arms 55, the frame 8 of the rear window structure 2 is pressed firmly against its seal and retained in that position.

The locking arm 68 or the latch 67 of each arm 55 can be manually unlocked, after which the rear window structure 2 can be pivoted upwards about the hook-shaped member 53 of the fitting element 42, which functions as a hinge in this case. The pins 60 and 61 move through the associated slots 62 and 63, thus defining the relative movement between the arm members 56 and 59. The gas spring 79 exerts an upward moment on the associated arm 55, so that the weight of the rear window structure 2 is compensated and said upward pivoting does not require too much force. The moment about the pivot 57 decreases slightly upon movement of the arm members to the intermediate position, on account of the pivoting movement of the second arm member 59 about the pivot 57. The second locking pin 75 moves towards the locking portion 74 along the edge of the locking slot 73 in the locking plate 72.

Figure 10B:
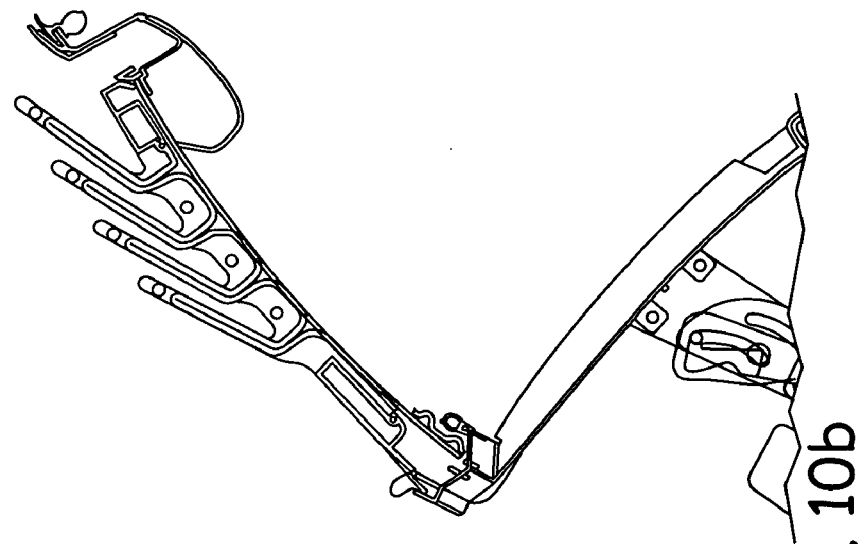
FIG. 10 are longitudinal sectional views of the rear side of a vehicle fitted with the open roof construction according to the invention, in which various positions of the rear window structure are shown for the purpose of illustrating the operation thereof.
Figure 10A:
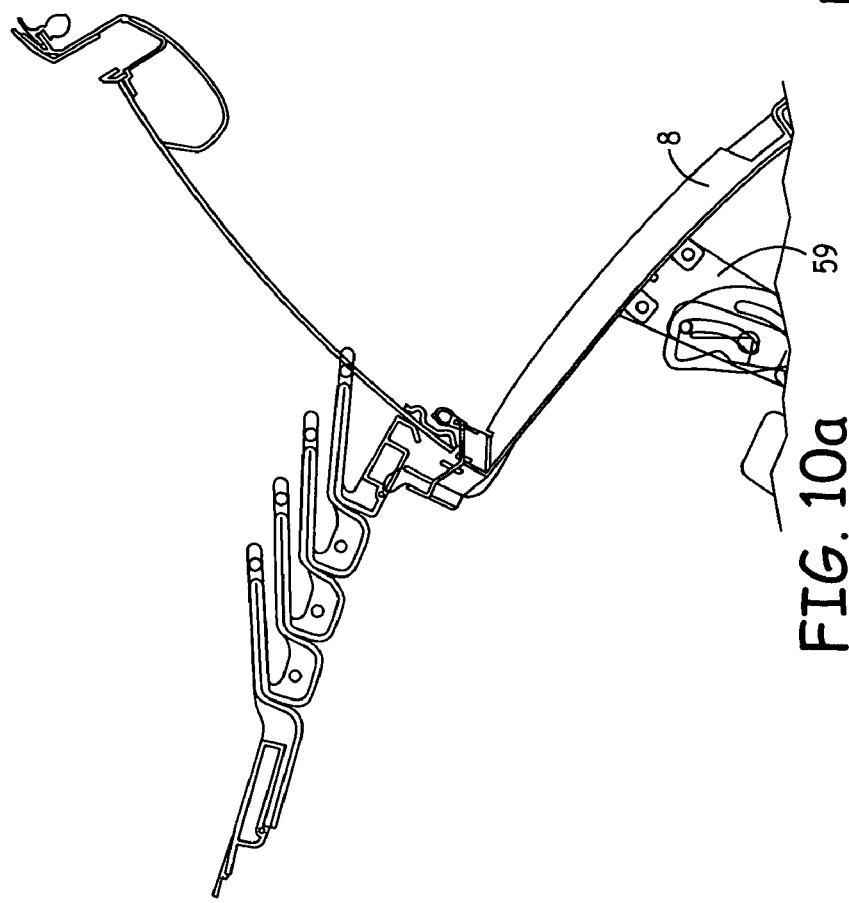
Figure 10E:
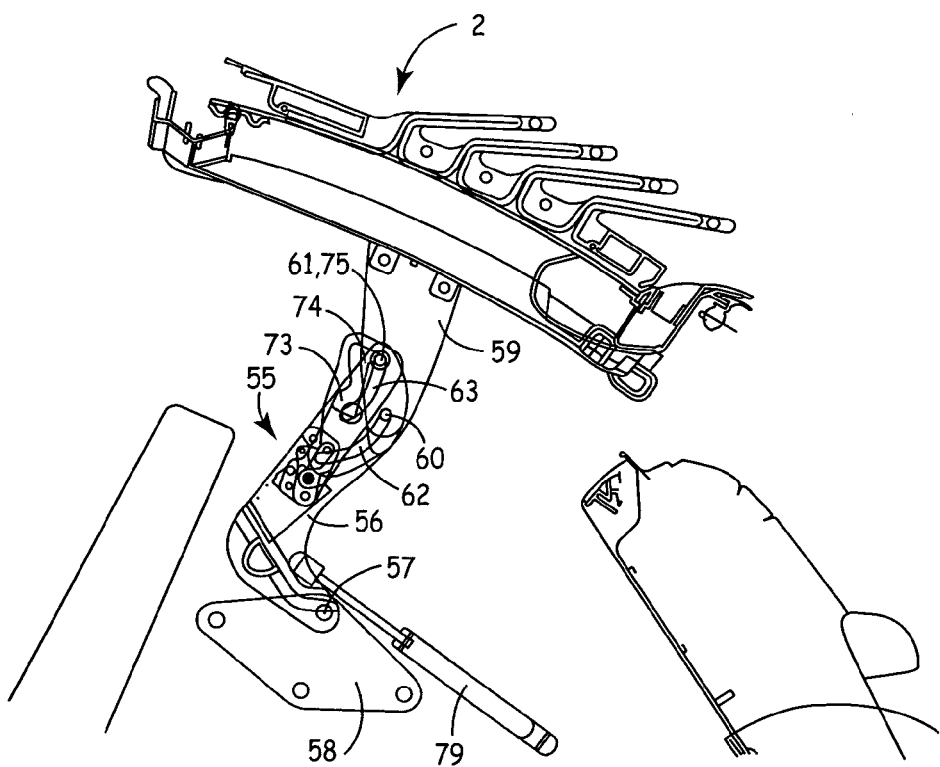
Figure 10F:
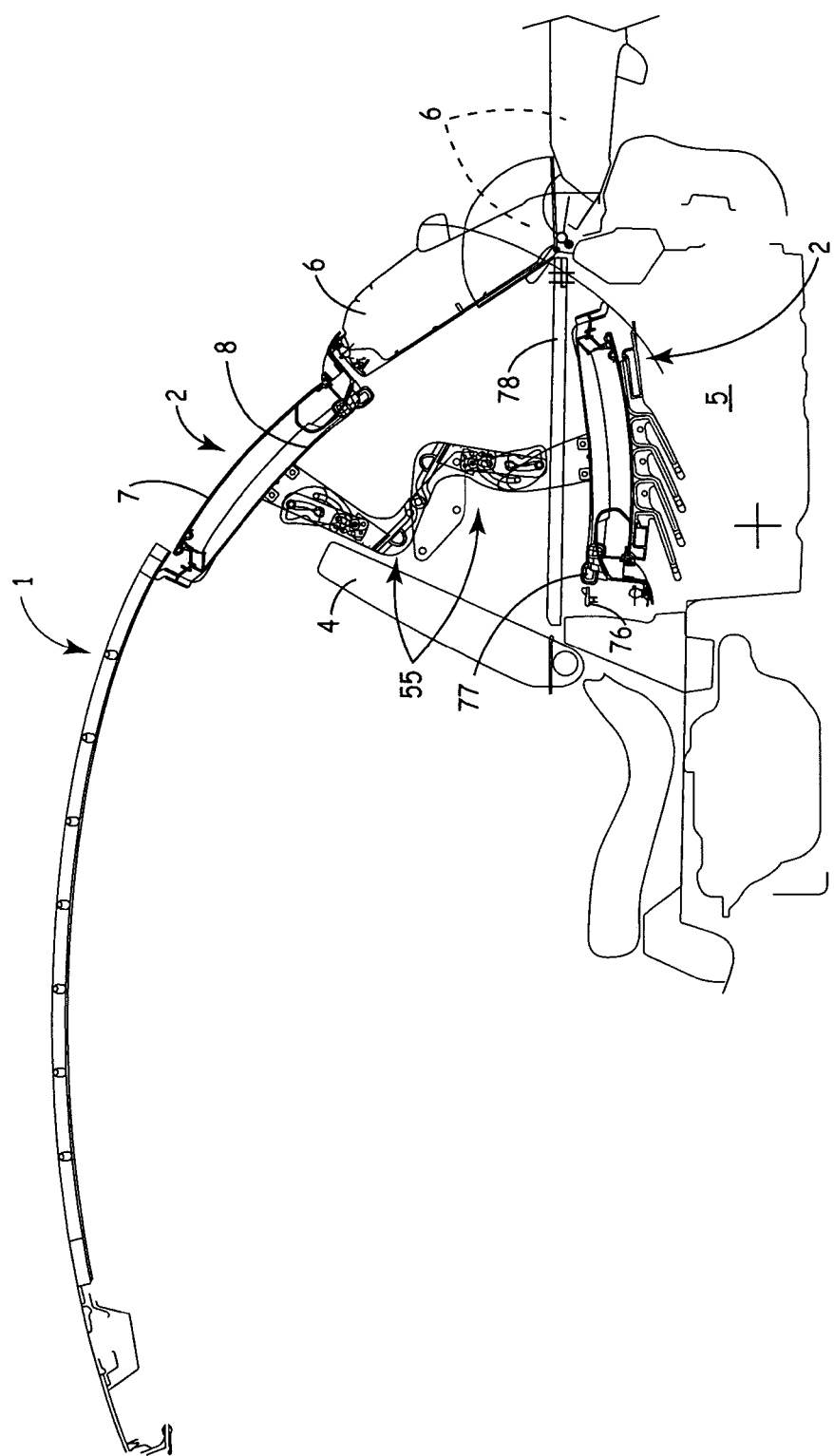

Upon reaching the intermediate position, in which the rear window structure 2 is maximally pivoted outwards (FIG. 10e), the second locking pin 75 of the second arm member 59 has reached the locking portion 74 of the locking slot 73, and as a result of the spring force in anti-clockwise direction, seen in the drawing, the locking portion 74 will automatically slip over the second locking pin 75, thus locking the two arm members 56 and 59 in position with respect to each other. The rear window structure 2 has pivoted so far upwards and outwards in this intermediate position that the hook-shaped members 53, which act as hinges, have moved out of the locking recesses 54 in the counter element 43, or, at any rate, have moved so far outwards that the hook-shaped members 53 do not resist pivoting movement of the rear window structure 2 about the pivot 57 of the arms 55. It is possible, therefore, to lower the rear window structure 2 from this intermediate position and cause it to pivot about the pivot 57, in such a manner that the rear window structure 2 will eventually be accommodated in upside-down position in a hollow space in the boot 5 of the vehicle, in which a locking element 76 engages a part 77 of the frame 8 of the rear window structure 2, thus securing the rear window structure 2 in this lower position (FIG. 10f). The rear window structure 2 can be covered again by means of a floor part 78, so that a boot will be available again, in which luggage can be placed in the closed position of the boot lid 6 and on which large pieces of luggage can be placed in the open position of the boot lid 6.

What is claimed is:

1. A vehicle comprising a rear window structure as well as a co-operating assembly fixed to the vehicle, wherein the rear window structure comprises a hinge assembly pivotally connected to said co-operating assembly, wherein the hinge assembly includes an intermediate element, which is on the one hand pivotally connected to the rear window assembly via a first hinge and which is on the other hand pivotally connected to the co-operating assembly via a second hinge, which is spaced from the first hinge by a some distance, wherein the intermediate element, the rear window structure and the co-operating assembly includes first and second stops which define the maximum pivoting movement with respect to the closing part and the co-operating part, and wherein said stops are made up of first and second pin-slot joints, wherein the respective first and second slots extend around the associated first and second hinges in the form of a segment of a circle.

2. A vehicle comprising a rear window structure as well as a co-operating assembly fixed to the vehicle, wherein the rear window structure comprises a hinge assembly pivotally connected to said co-operating assembly, wherein the hinge assembly includes an intermediate element, which is on the one hand pivotally connected to the rear window assembly via a first hinge and which is on the other hand pivotally connected to the co-operating assembly via a second hinge, which is spaced from the first hinge by a some distance, wherein the rear window structure comprises a pivotable rear window of a vehicle, and wherein the co-operating assembly comprises a folding roof.

3. The vehicle according to claim 2, wherein the folding roof can be opened and closed by means of driving cables, whereas the folding roof is so arranged that it is positioned on the rear window structure in the entirely open position, with the cables extending from the rear window structure, past the hinge assemblies, to the co-operating assembly.

4. The vehicle according to claim 2, wherein the folding roof includes a closure element and at least one guide rail provided with a groove, in which at least one sliding shoe or slide of the closure element is guided, which guide rail is built up of a number of rail parts provided on the co-operating assembly and the rear window of the vehicle and joining each other in the longitudinal direction, which rail members can be connected to and disconnected from each other, when closing and opening the rear window wherein the grooves in said parts of the guide rail diverge slightly at the ends facing towards each other in the interconnected condition.

5. The vehicle according to claim 4, wherein the grooves in said parts of the guide rail diverge in transverse direction and in vertical direction at their ends facing towards each other.

6. The vehicle according to claim 4, wherein one part of the guide rail is present on the rear window and the co-operating part of the guide rail is present on a roof part of the vehicle.

7. A vehicle comprising a rear window structure as well as a co-operating assembly fixed to the vehicle, wherein the rear window structure comprises a hinge assembly pivotally connected to said co-operating assembly, wherein the hinge assembly includes an intermediate element, which is on the one hand pivotally connected to the rear window assembly via a first hinge and which is on tho other hand pivotally connected to the co-operating assembly via a second hinge, which is spaced from the first hinge by a some distance, wherein the rear window structure comprises a pivotable rear window of a vehicle, and wherein the co-operating assembly and the rear window structure include a locking element and a mating counter element, wherein said locking element includes a self-locating fitting means, which can mate with the counter element.

8. The vehicle according to claim 7, wherein the locking element is a hook-shaped member, which can engage in a locking recess.

9. The vehicle according to claim 8, wherein the locking element itself is positioned on a fitting element and wherein the locking recess is positioned on the counter element.

10. The vehicle according to claim 8, wherein the locking element mates with a retaining mechanism, which retains the locking element in the locking recess as long as the locking element does not engage sufficiently far in the locking recess.

11. The vehicle according to claim 10, wherein the retaining mechanism includes a spring-loaded retaining element, which extends into the locking recess and which is provided with a nose which can engage in a locking recess in the locking element, wherein the retaining element, which is capable of sliding movement and pivoting movement about a traverse pin, extends obliquely in the direction of the opening of the locking recess in a starting position, in which position it lies in the path of the locking element, in such a manner that when the locking element engages in the locking recess, the retaining nose of the retaining element will first be pushed back slightly and then snap into the recess in the locking element under the influence of the action of the spring, after which the locking element is prevented from being pulled out again as a result of the locking nose hooking into the recess, and wherein the retaining element is moved about the traverse pin when the locking element is inserted further to a locked position in the locking recess, as a result of which the retaining nose will move out of the recess again and the retaining element will follow the locking element when the locking element moves out of the locking recess from the locked position as a result of the spring action and return to the starting position.

12. The vehicle according to claim 8, wherein both the hook-shaped element and the locking recess are tapered both in vertical direction and in transverse direction.

13. A vehicle comprising a closing part as well as a part of the vehicle that co-operates therewith, which closing part is pivotally connected to said co-operating part by means of a hinge assembly, the hinge assembly including an intermediate element, which is on the one hand pivotally connected to the closing part via a first hinge and which is on the other hand pivotally connected to the co-operating part via a second hinge, which is spaced from the first hinge by some distance, wherein the intermediate element, the closing part and the co-operating part include first and second stops which define the maximum pivoting movement with respect to the closing part and the co-operating part, wherein said stops are made up of first and second pin-slot joints, wherein the respective first and second slots extend around the associated first and second hinges in the form of a segment of a circle.

14. A vehicle comprising a closing part as well as a part of the vehicle that co-operates therewith, which closing part is pivotally connected to said co-operating part by means of a hinge assembly, the hinge assembly including an intermediate element, which is on the one hand pivotally connected to the closing part via a first hinge and which is on the other hand pivotally connected to the co-operating part via a second hinge, which is spaced from the first hinge by some distance, wherein the closing part is a pivotable rear window of a vehicle, whereas the co-operating part is a roof part, and wherein the roof part comprises a folding roof.

15. A vehicle comprising:
a roof assembly of a vehicle, wherein the roof assembly comprises a locking element;
a rear window structure;
a hinge assembly that removably and pivotally connects the the rear window structure to the roof assembly, wherein the hinge assembly comprises:
a first hinge,
a second hinge;
a counter element having a locking recess that engages the locking element to removably and pivotally connect the rear window structure to the roof assembly;
an intermediate element that is pivotally connected to the rear window structure via the first hinge and pivotally connected to the a counter element via the second hinge.

16. The vehicle of claim 15, wherein the hinge assembly includes first and second stops which define the maximum pivoting movement with respect to the rear window structure and the counter element.

17. The vehicle of claim 16, wherein said stops are made up of first and second pin-slot joints, and wherein the respective first and second slots extend around the associated first and second hinges in the form of a segment of a circle.

18. The vehicle of claim 15, wherein the rear window structure comprises a pivotable rear window of a vehicle.

19. The vehicle of claim 18, wherein the roof assembly comprises a folding roof.

* * * * *